United States Patent
Kim et al.

(10) Patent No.: US 7,364,363 B2
(45) Date of Patent: Apr. 29, 2008

(54) BEARING AND TURBO COMPRESSOR COMPRISING THE SAME

(75) Inventors: Sang Wook Kim, Suwon-si (KR); Phil Soo Chang, Seongnam-Si (KR); Ji Hoon Choi, Gimpo-Si (KR)

(73) Assignee: Samsung Electronics Co., Ltd., Suwon (KR)

( * ) Notice: Subject to any disclaimer, the term of this patent is extended or adjusted under 35 U.S.C. 154(b) by 104 days.

(21) Appl. No.: 11/128,341

(22) Filed: May 13, 2005

(65) Prior Publication Data

US 2006/0045396 A1  Mar. 2, 2006

(30) Foreign Application Priority Data

Aug. 13, 2004  (KR) ...................... 10-2004-0063930

(51) Int. Cl.
   *F16C 27/02*  (2006.01)
(52) U.S. Cl. ...................... 384/103; 384/105
(58) Field of Classification Search ............... 384/105, 384/106, 104, 103
   See application file for complete search history.

(56) References Cited

U.S. PATENT DOCUMENTS

| 4,482,303 A | 11/1984 | Acosta | |
| 4,549,821 A * | 10/1985 | Kawakami | 384/103 |
| 5,634,723 A * | 6/1997 | Agrawal | 384/106 |
| 5,871,284 A * | 2/1999 | Nadjafi et al. | 384/105 |
| 5,961,217 A | 10/1999 | Heshmat | |
| 6,158,893 A | 12/2000 | Heshmat | |

FOREIGN PATENT DOCUMENTS

| EP | 1 270 971 A1 | 1/2003 |
| JP | 6505547 A | 6/1994 |
| KR | 10-2000-0008563 A | 2/2000 |
| KR | 10-0253247 | 5/2000 |
| KR | 10-2000-0056446 A | 9/2000 |
| KR | 10-2000-0065623 A | 11/2000 |
| KR | 10-0273374 | 1/2001 |
| KR | 10-273376 | 1/2001 |
| KR | 10-0304563 | 12/2001 |
| KR | 10-0320193 | 1/2002 |
| KR | 10-0339545 | 6/2002 |
| KR | 10-0365806 | 12/2002 |
| KR | 10-0379497 | 4/2003 |
| KR | 10-399325 | 9/2003 |
| KR | 10-0414110 | 1/2004 |

* cited by examiner

*Primary Examiner*—William C. Joyce
(74) *Attorney, Agent, or Firm*—Sughrue Mion, PLLC

(57) ABSTRACT

A thrust bearing designed to support a rotational shaft within a turbo compressor, and including foils subjected to a friction with gas. The bearing includes a plurality of elastic foils having different stiffnesses from each other.

10 Claims, 5 Drawing Sheets

BEARING AND TURBO COMPRESSOR COMPRISING THE SAME

CROSS-REFERENCE TO RELATED APPLICATION

This application claims priority from Korean Patent Application No. 2004-63930, filed on Aug. 13, 2004 in the Korean Intellectual Property Office, the disclosure of which is incorporated herein by reference.

BACKGROUND OF THE INVENTION

1. Field of the Invention

The present invention relates to a bearing and, more particularly, to a thrust bearing which comprises foils subjected to a friction with gas, and is equipped in a turbo compressor to support a rotational shaft in an axial direction of the rotational shaft.

2. Description of the Related Art

Generally, compressors are used to compress gas, such as air or refrigerant gas. Among the compressors, a turbo compressor forces an impeller to rotate by virtue of a driving force of a motor, and then, intakes and compresses gas with a centrifugal force generated by a rotation of the impeller.

As for components acting to support the rotational shaft, bearings can be classified into a radial bearing and a thrust bearing according to a direction of a load applied to the shaft. As is disclosed in Korean Patent Registration No. 10-0399325, the turbo compressor is provided with the radial bearing and the thrust bearing to support the rotational shaft.

Referring to FIG. 1, a conventional thrust bearing 30 has a configuration wherein several elastic foils 31 overlap each other on one side of a disk-shaped base 33 having an opening 30a formed at the center thereof, so that the elastic foils 31 contact a disk, not shown, equipped to a rotational shaft, not shown. When a predetermined period is passed after a rotation of the rotational shaft, a gaseous film is formed between the disk and the elastic foils 31, so that the disk is spaced a predetermined distance from the elastic foils 31.

However, according to the conventional bearing 30, when increasing the stiffness of the elastic foils 31 in order to enhance the load capacity of the bearing 30, the gaseous film is formed between the disk and the elastic foils 31, lowering the separating speed of the disk from the elastic foils. As a result, a great amount of friction is generated between the disk and the elastic foils 31, resulting in damage to a surface of the elastic foils and a mechanical malfunction of the turbo compressor.

SUMMARY OF THE INVENTION

The present invention has been made in view of the above and other problems, and an aspect of the present invention is to provide a bearing, which comprises a plurality of elastic foils having different radii of curvature or stiffnesses from each other, thereby enhancing a load capacity of a disk, and preventing damage to a surface of the elastic foils and a mechanical malfunction of the turbo compressor, and a turbo compressor comprising the same.

Additional aspects and/or advantages of the invention will be set forth in part in the description which follows and, in part, will be apparent from the description, or may be learned by practice of the invention.

Consistent with the present invention, these and/or other aspects are accomplished by providing a bearing, comprising a plurality of elastic foils having different stiffnesses from each other.

In the bearing, the elastic foils may have different radii of curvature from each other.

The elastic foils may be circumferentially arranged on a disk-shaped base.

The elastic foils may comprise inner foils circumferentially arranged on an inner portion of the base, and outer foils circumferentially arranged on an outer portion of the base.

The inner foils may have a lower stiffness and a higher radius of curvature than the outer foils.

Each of the elastic foils may have one end supported by the base, and the other end placed on an adjacent elastic foil.

In accordance with the present invention, there is provided a bearing, comprising a plurality of elastic foils having different radii of curvature from each other.

In the bearing, the elastic foils may have different stiffnesses from each other.

In accordance with the present invention, there is provided a turbo compressor, including a bearing comprising a plurality of elastic foils having different radii of curvature from each other.

In the turbo compressor, the elastic foils may have different radii of curvature from each other.

The turbo compressor may further comprise a rotational shaft having at least one impeller and a disk equipped thereto, and the disk may be supported by the elastic foils.

BRIEF DESCRIPTION OF THE DRAWINGS

These and/or other aspects and advantages of the invention will become apparent and more readily appreciated from the following description of the exemplary embodiments, taken in conjunction with the accompanying drawings, in which.

Figure 1:
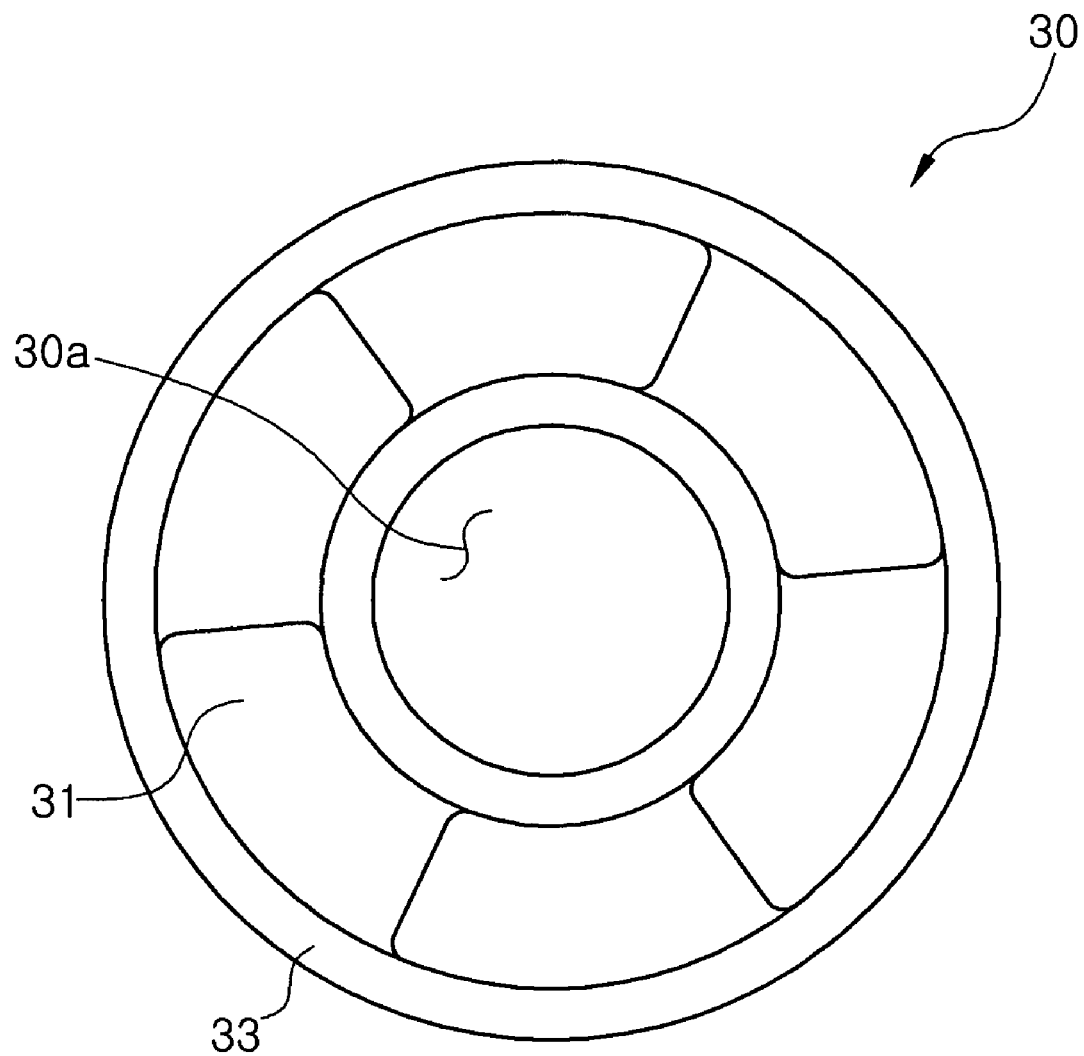
FIG. 1 is a front view illustrating a conventional bearing.

DETAILED DESCRIPTION OF THE ILLUSTRATIVE, NON-LIMITING EMBODIMENTS OF THE INVENTION

Reference will now be made in detail to illustrative, non-limiting embodiments of the present invention, examples of which are illustrated in the accompanying drawings. The embodiments are described below to explain the present invention by referring to the drawings.

Figure 2:
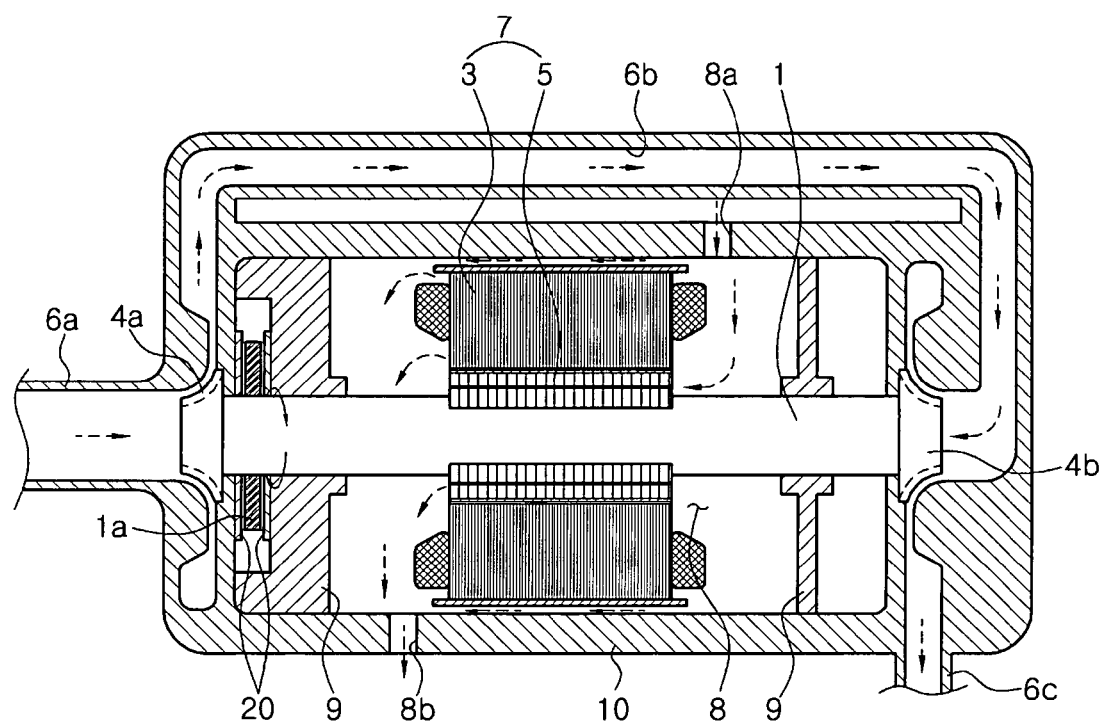
FIG. 2 is a cross-sectional view illustrating a turbo compressor consistent with the present invention.

Referring to FIG. 2, a turbo compressor consistent with the present invention has a housing 10 with a driving chamber 8 formed therein. The driving chamber 8 is provided with a rotational shaft 1 across the driving chamber 8. The rotational shaft 1 is equipped around the center thereof with a rotator 5. A stator 3 is equipped at an outer portion of the rotator 5 corresponding to a location of the rotator 5 within a wall of the driving chamber 8. A driving motor 7 comprising the stator 3 and the rotator 5 forces the rotational shaft to rotate by virtue of electromagnetic cooperation of the stator 3 and the rotor 5 when electric power is applied from a power supplier to the driving motor 7. The driving chamber 8 is equipped with several radial bearings 9 and thrust bearings 20 to support the rotational shaft 1 within the driving chamber 8. The thrust bearings 20 are equipped on both sides of a disk 1a provided around an outer periphery of the rotational shaft 1 such that the thrust bearings 20 contact the disk 1a, thereby supporting the rotational shaft 1 in an axial direction of the rotational shaft 1.

The rotational shaft 1 is provided with impellers 4a and 4b fixed to both ends of the rotational shaft 1. Among the impellers 4a and 4b, a first stage impeller 4a is provided to an intake port of the housing 10, and a second stage impeller 4b is provided to a discharge port of the housing 10. The housing 10 is formed with an intake pipe 6a communicated with the outside in order to allow a refrigerant to be taken in from the outside to the first stage impeller 4a, and with a discharge pipe 6c communicated with the outside in order to allow a compressed refrigerant to be discharged from the second stage impeller 4b to the outside. The first stage impeller 4a is communicated with the second stage impeller 4b via a connecting pipe 6b.

Accordingly, when the driving motor 7 rotates the rotational shaft 1, the first stage impeller 4a and the second stage impeller 4b are also rotated. The refrigerant, having flowed into the housing 10 through the intake pipe 6a by virtue of rotation of the first stage impeller 4a, is primarily compressed by the first stage impeller 4a, and is then supplied to the second stage impeller 4b through the connecting pipe 6b. The second stage impeller 4b secondarily compresses the primarily compressed refrigerant, and discharges secondarily compressed refrigerant to the discharge pipe 6c.

Meanwhile, in order to prevent efficiency of the turbo compressor from being lowered due to heat generated from the driving motor 7 when driving the driving motor 7, the housing 10 is formed with a cooling refrigerant intake port 8a and a cooling refrigerant discharge port 8b, which are communicated with the driving chamber 8. That is, an interior of the driving chamber 8 is cooled by forcing some portion of the refrigerant circulating within a refrigerant cycle to flow to the driving chamber 8 through the cooling refrigerant intake port 8a, and to return to the refrigerant cycle through the cooling refrigerant discharge port 8b.

Figure 3:
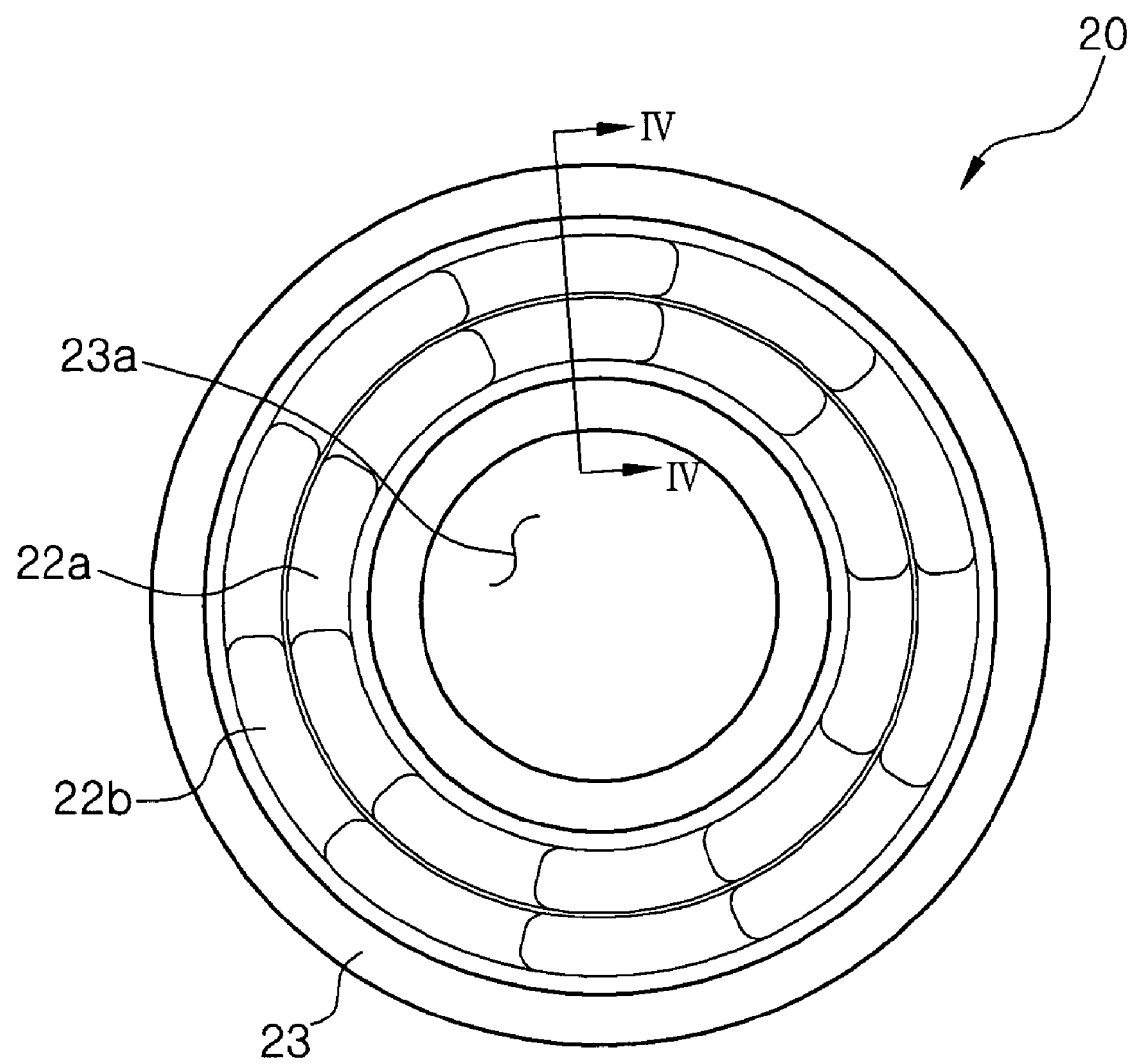
FIG. 3 is a front view illustrating a bearing of the turbo compressor consistent with the present invention.
Figure 4:
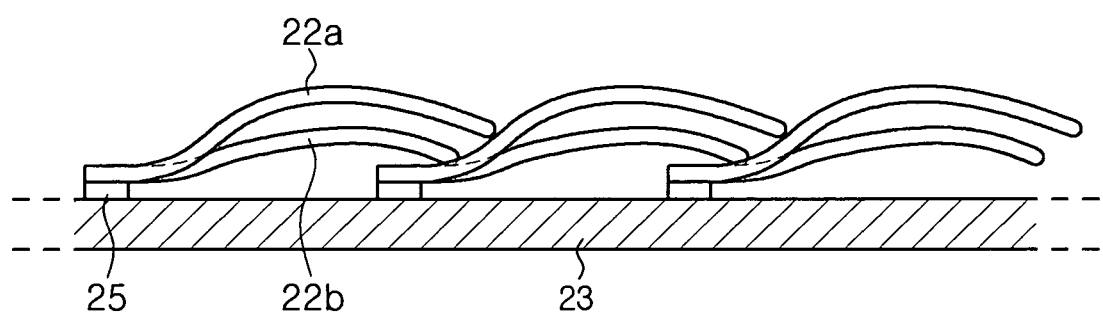
FIG. 4 is a cross-sectional view taken along the line IV-IV of FIG. 3, illustrating the bearing of the turbo compressor consistent with the present invention.

Meanwhile, referring to FIGS. 3 and 4, the bearing 20 according to the present invention has a disk-shaped base 23 with an opening 23a formed at the center of the base 23, and a plurality of elastic foils 22a and 22b attached to one side of the base 23. The elastic foils 22a and 22b comprise inner foils 22a attached to an inner portion of the base 23, and outer foils 22b attached to an outer portion of the base 23. The elastic foils 22a and 22b are circumferentially arranged on the one side of the base such that the inner foils 22a overlap each other, while the outer foils 22b overlap each other.

Referring to FIG. 4, each of the elastic foils 22a and 22b has one end fixed to the base 23 via a supporting member 25, and the other end positioned on an upper portion of the other adjacent elastic foil, respectively. Specifically, the inner foils 22a have a radius of curvature higher than that of the outer foils 22b, and have a separation from the base 23 higher than that of the outer foils 22b. Furthermore, the inner foils 22a have a relatively low stiffness, compared with that of the outer foils 22b.

Figure 5:
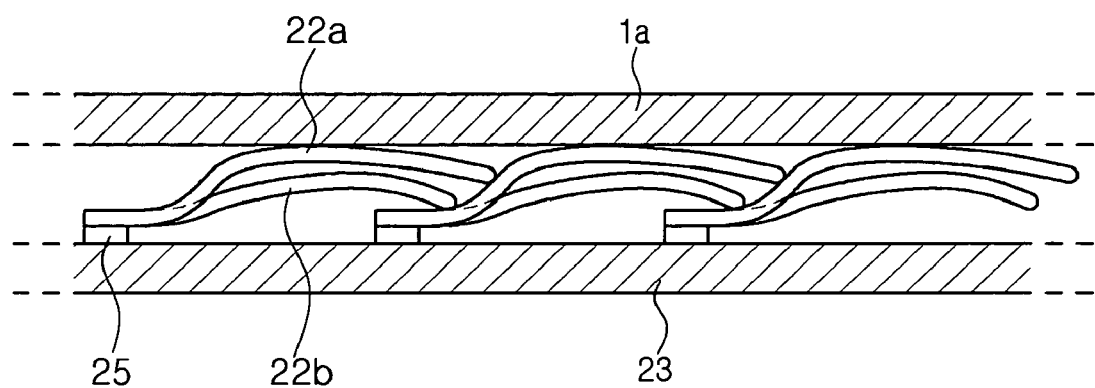
FIG. 5 is a cross-sectional view illustrating the bearing of the turbo compressor consistent with the present invention, showing a state of the disk closely contacting the bearing.

As a result, as shown in FIG. 5, when the rotational shaft 1 and the disk 1a provided to the rotational shaft 1 are not rotated, or at an initial time of the rotation of the rotational shaft 1, the inner foils 22a contact the disk 1a while the outer foils 22b do not contact the disk 1a. As a result, since the contact between the disk 1a and the bearing 20 mainly occurs at the inner foils 22a having the lower stiffness, abrasion of the elastic foils 22a and 22b caused by the friction between the disk 1a and the bearing 20 is reduced in amount, and thus the mechanical malfunctions of the turbo compressor are reduced at the same time.

Furthermore, when a predetermined period is passed after the rotational shaft 1 is driven, gaseous films having a predetermined space are formed between the disk 1a and the inner foils 22a, and between the disk 1a and the outer foils 22b, so that the inner foils 22a and the outer foils 22b are separated from the disk 1a. At this time, the disk 1a is simultaneously supported by the inner foils 22a and the outer foils 22b, so that the load is dispersed to the inner foils 22a and the outer foils 22b, thereby increasing the load capacity of the disk 1a.

Although a few exemplary embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A bearing, comprising a plurality of elastic foils having different stiffnesses from each other, wherein the elastic foils have different radii of curvature from each other, and wherein each of the elastic foils has one end supported by a base, and the other end placed on an adjacent elastic foil.

2. The bearing according to claim 1, wherein the elastic foils are circumferentially arranged on the base, the base being disk-shaped.

3. The bearing according to claim 2, wherein the elastic foils comprise inner foils circumferentially arranged on an inner portion of the base, and outer foils circumferentially arranged on an outer portion of the base.

4. The bearing according to claim 3, wherein the inner foils have a lower stiffness and a higher radius of curvature than the outer foils.

5. The bearing according to claim 1, wherein the one end supported by the base is fixed to the base via a supporting member.

6. A bearing for supporting a rotational disk, said bearing comprising:
   a stationary disk-shaped base; and
   a plurality of elastic foils having different stiffnesses from each other and being disposed on a side of said disk-shaped base which faces said rotational disk, wherein when said rotational disk is at rest or at an initial time of rotation, at least some of said plurality of elastic foils contact said rotational disk, while others of said plurality of elastic foils do not contact said rotational disk.

7. The bearing according to claim 6, wherein said elastic foils have different radii of curvature from each other.

8. The bearing according to claim 6, wherein said elastic foils are circumferentially arranged on said disk-shaped base.

9. The bearing according to claim 6, wherein said elastic foils comprise inner foils circumferentially arranged on an inner portion of said disk-shaped base, and outer foils circumferentially arranged on an outer portion of said disk-shaped base.

10. The bearing according to claim 9, wherein said inner foils have a lower stiffness and a higher radius of curvature than said outer foils.

* * * * *